United States Patent Office 3,520,045
Patented July 14, 1970

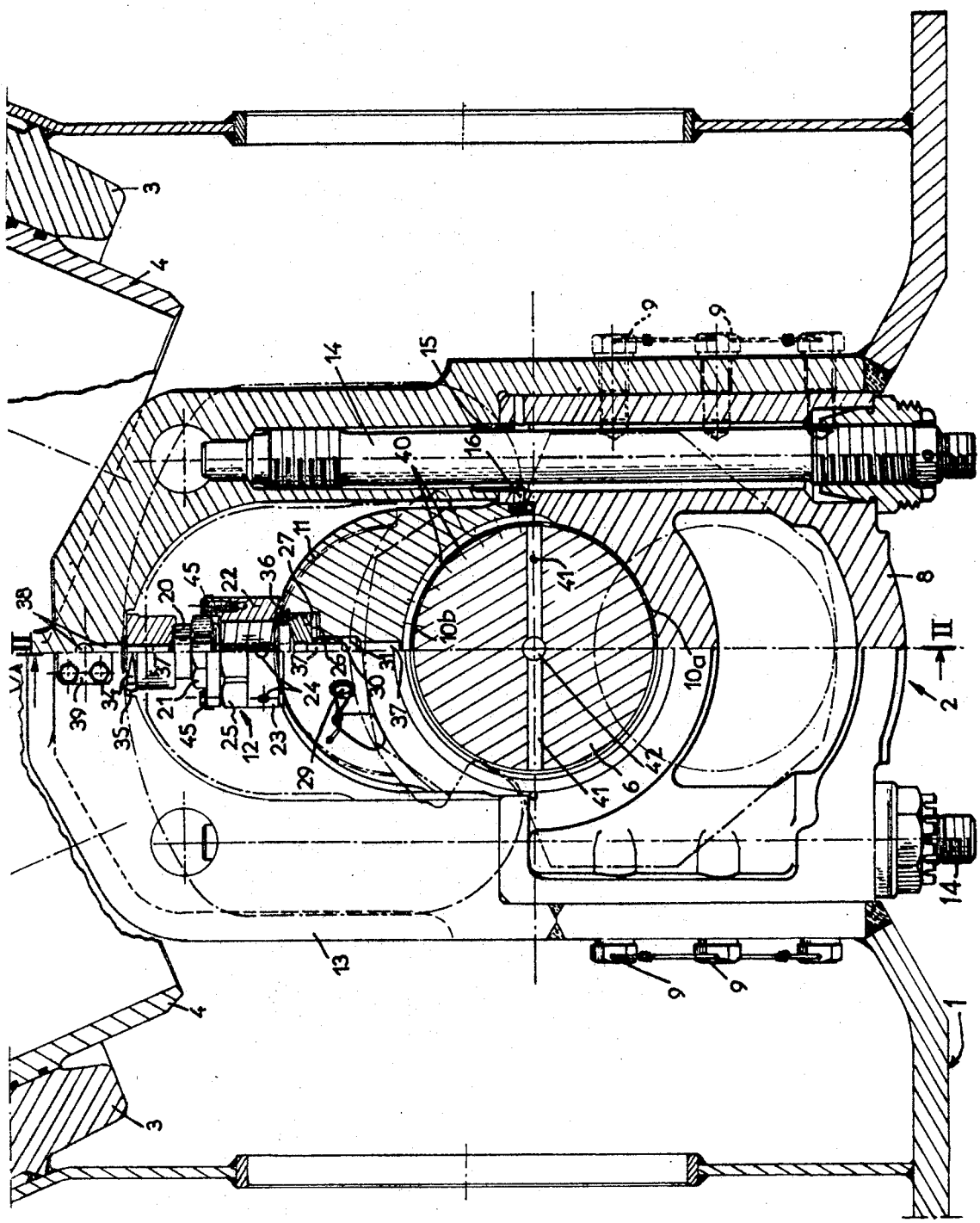

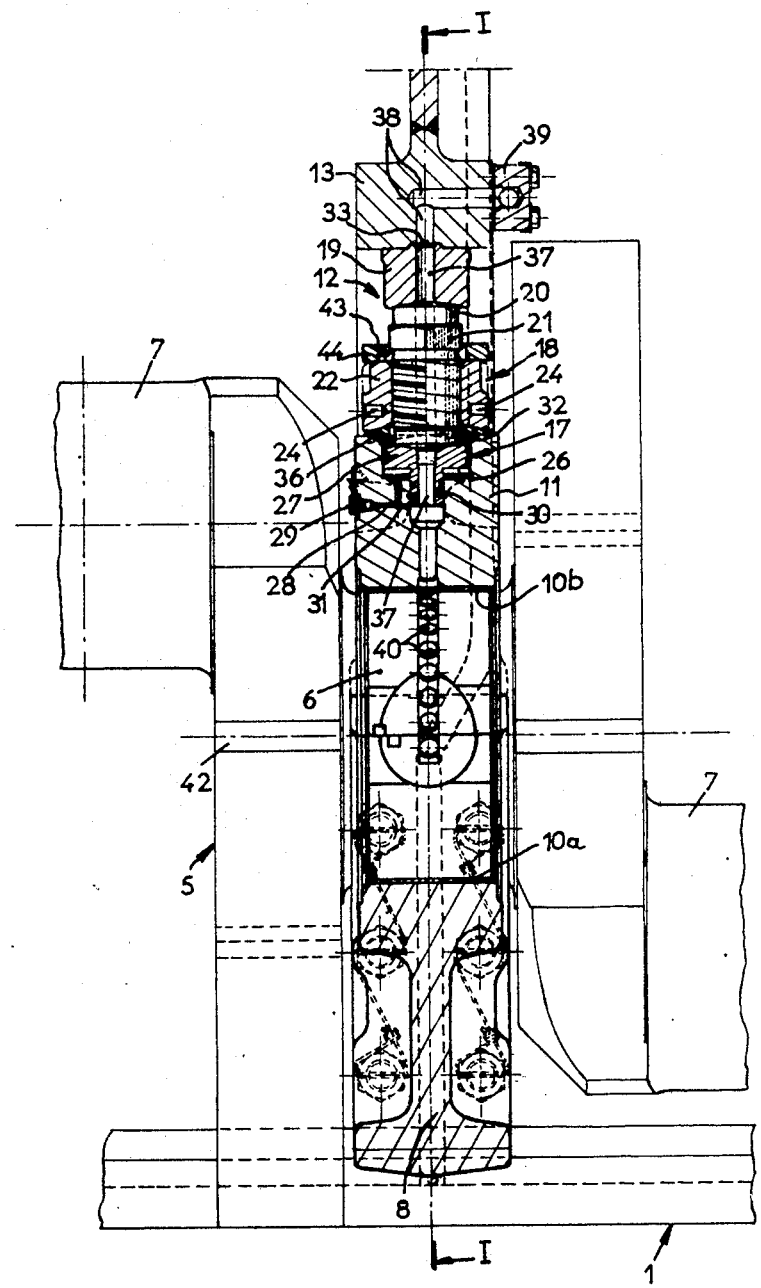

3,520,045
ADJUSTABLE CLAMPING DEVICE FOR SECURING A REMOVABLE PART TO A SUPPORT AND ITS VARIOUS APPLICATIONS
Karl Kühn, Saint-Germain-en-Laye, France, assignor to Societe d'Etudes de Machines Thermiques, Saint-Denis, Seine-Saint-Denis, France, a company of France
Filed Oct. 3, 1967, Ser. No. 672,481
Claims priority, application France, Jan. 9, 1967, 90,415
Int. Cl. B23p 19/04
U.S. Cl. 29—200
10 Claims

ABSTRACT OF THE DISCLOSURE

A clamping device for pressing the bearing cap against the bearing saddle of a crank-shaft bearing, comprising at least one threaded thrust pin engaging with its top end the crank-case through an intermediate pad element and a nut screwed on said pin and engaging said bearing cap towards the bottom end of said pin which is engageable endwise by a hydraulically actuated piston slidably mounted in a pressure fluid working chamber formed in said bearing cap, a bore extending axially through said pad, pin and piston for interconnecting oil ducts in the crank-case and bearing cap, respectively.

---

The present invention essentially relates to a clamping device for accurately, positively and selectively, tightly securing a removable or at least relatively displaceable part to or on a support, said invention also being concerned with the various applications of said device.

In the mechanical rigid working assemblies, i.e. those which are often of temporary character, and have to be easily disassembled and are secured from separation by disengagement or against relative slippage through mutual displacement, it is frequently necessary to effect the fastening, connection or attachment of a removable part to another part or to any support with some predetermined securing force, i.e. with a correct or suitable clamping force which should be controllable or checkable as accurately as possible. Such is the case in particular of so-called open assemblies, i.e. having one single direction of action and kept assembled together by an applied external, for example pressure force. A usual, common practice example of assemblies subjected to a suitable securing or tightening is provided by the so-called bifurcated couplings. More especially such an example is provided, in the case of a horizontal plane cylindrical split journal bearing or like pillow-block or pedestal bearing sustaining radial loads and adapted to support a rotor shaft of a rotary machine or a crank-shaft of a reciprocating piston engine or machine or even a transmitting shaft, by the assembly of a keep, binder or bearing cap with the bearing saddle or body upon exerting an accurate predetermined tightening, clamping or securing force, said bearing cap generally serving as a fitted housing for a half upper journal rest, bushing or shell, adapted to encompass or to enclose the journal of the revolving shaft to be supported.

Securing and clamping devices are already known, which are adapted for the use set forth hereinabove and are of the type comprising at least one pressure or thrust element with an active, operative or useful length variable selectively or at will, forming a screw jack, actuator or the like, coaxially associated with a preferably single acting or one-way hydraulic piston jack or ram for applying preliminary temporary action to produce the desired clamping or tightening pressure.

In the case of reciprocating piston machines, such as heat engines, for example internal combustion engines, devices of the aforesaid type have already been suggested or used for pressing the bearing cap of a main crank-shaft bearing towards or against the seat or bearing base block accommodating the bushing, bearing shell or journal rest, by means of pressure or thrust pins or bolts engaging or bearing against the crank case or engine frame and which enable to adjust in a simple manner to the desired value, the clamping or securing force acting upon the bushings or bearing shells. Each one of such known pressure or thrust pins or bolts comprises a hydraulic piston jack or ram actuator, directly incorporated to said pressure or thrust pin of which it forms an integral part. Such a known arrangement suffers from the drawback inherent with a relatively complex structure or construction of the pressure element, which is therefore rather expensive to manufacture and of an uncertain reliability in view of the relatively great number of component parts forming the pressure element, as well as the possibly increased risk or danger of mechanical failure or breaking on account of the relatively significant slenderness or elongated shape of the pressure element likely to promote buckling thereof. A further inconvenience of this known device resides in the fact that the substantially cylindrical pressure fluid working chamber of variable volume, wherein the hydraulic jack or actuator piston is slidably mounted, comprises at least two sealing joint sliding and rotating contact surfaces located adjacent to the jack piston and to a movable sliding part or member closing the bottom of the pressure fluid working chamber, which sealing joint surfaces are adapted to separate or to seal off said chamber from the environmental outside space, so that there are two possibilities or risks of oil or hydraulic liquid leakage to a space where said oil is likely to be lost or wasted or is at the least unlikely to be recovered and directed or conveyed directly to the bearing bushing or shell for the lubrication thereof.

One object of the present invention is to remove or at least to obviate to said inconveniences. To this end, the device according to the invention, which is of the type wherein it is interposed between two mutually facing, registering or confronting supporting structures respectively consisting of the removable part to be secured and clamped and of a structural portion or abutment which is relatively fixed or stationary or integral with the support of said part, while bearing against or engaging these two supporting structures, respectively, by its opposite ends, is characterized in that said hydraulic jack is incorporated to one of said two facing or confronting supporting structures, so as to be substantially in extension of said pressure element, whereby its movable piston or a portion integral therewith is tightly engageable through hydraulic pressure with said pressure element at the adjacent end thereof, the cylindrical working chamber of said hydraulic jack being preferably accommodated or recessed directly into the thickness or material of the associated supporting structure. This arrangement offers the advantage of a simplified structure or construction for the pressure element or pin, since the latter only consists of two parts, namely the pressure screw and the nut, so that the pressure element may be made shorter and is economical to manufacture and to replace. In effect, in case of replacement of a pressure element, the hydraulic jack is not effected thereby since it remains in its place, whereas in the known device, forming a complex unitary system combination of a screw jack and of a hydraulic jack, the whole unitary assembly has to be replaced.

According to another feature of the invention, the nut of said pressure element or thrust members engages or bears against the supporting structure associated with said hydraulic jack and the screw of said pressure element preferably extends into the working chamber for the piston of said hydraulic jack, through a hole or aperture formed in the outer bottom of said chamber, so as to be able to co-operate directly with the corresponding outer front, terminal or end face of said piston. The advantage of such a construction resides in the fact that, contrary to the aforesaid known device which is in contact with the supporting structure located towards the nut by the end of a hollow rod or of a tubular pin, hence with a reduced bearing or contacting surface incurring the risk of deformations and bruises, the device according to the invention is directly in contact with said supporting structure through the medium of the nut of the screw jack, so that the pressure and local stresses or strains are more reduced, therefore resulting in a decreased risk of damage.

The invention is also concerned with the various applications of the aforesaid device and more particularly to the securing and controlled clamping of the bearing cap of a plane journal bearing for the revolving shaft of a machine or of a mechanical gearing, such application or use being characterized in that said hydraulic jack is directly incorporated into said bearing cap against which bears the nut of said pressure element, whereas the screw of said latter engages or bears, in a manner known per se, through the medium of an intermediate pad or like spacer member, against a clevis or bridge piece or like bearing arch or a part of the casing, stator or frame, preferably removable and integral with the base block or bearing saddle.

In the aforesaid known device, a channel, duct or bore for feeding or conveying lubricant to the bushing, bearing shell or brass, is drilled or extends through the intermediate pad or spacer member and the pressure or thrust element together with its jacking piston and communicates or connects, at one end through a connecting pipe, aperture or nipple provided sidewise on said intermediate pad or spacer member, with or to an oil supply or feed pipe or line and, at its other end with or to a conduit extending through the bearing cap to open into the housing area of the bushing, bearing shell or brass. This known arrangement suffers from the inconvenience of being relatively cumbersome and complicated, in view of the special construction required for the intermediate pad or spacer member and owing to the presence of the oil supply or feed line or pipe directly in the space left closely adjacent to and above the bearing cap. This inconvenience is avoided in the present invention by a further characterizing feature thereof, according to which the lubricating duct or bore for the bearing shell or bushing, known per se, extends in substantially coaxial relationship through the intermediate pad or spacer member, the screw, the jacking piston and the bearing cap to open at one end into the housing area for the bearing shell or bushing on the one hand and to communicate by the other end with a lubricant feed conduit provided in the said clevis of said bearing on the other hand. Due to the absence of any special piping or tubing directly connected to the pressure or thrust elements, the risks of pipe breaking, cracks or leakage, likely to be caused by the vibrations or jars directly transmitted to the piping by the pressure elements, are thus avoided.

Finally, the invention is also directed to the systems, apparatus and plants and more particularly to the shaft bearings fitted with said devices.

Other objects, features, advantages and details of the present invention will become clearly apparent and be better understood as the following explanatory description proceeds with reference to the accompanying diagrammatical drawings, given only by way of example illustrating a form of embodiment of the invention and wherein:

FIG. 1 is a fragmentary view, in half cross-section taken upon the line I—I of FIG. 2, of a main crank-shaft bearing of an internal combustion engine, for instance of the diesel type, provided with a device according to the invention;

FIG. 2 is a partial view in section taken along the line II—II of FIG. 1, showing said main crank-shaft bearing.

Referring to the embodiment shown in the drawings, the reference numeral 1 generally denotes the bed or foundation plate, forming the base for the main frame or engine case and supporting on the one hand the main crank-shaft bearings such as that generally designated by the reference numeral 2 and on the other hand, the cylinder block or engine girder 3 carried by the columns or entabletures forming the upward extension of the main frame or engine case and receiving the cylinder liners, jackets or sleeves 4. Each main drive or line-shaft bearing 2 is adapted to support the crank-shaft 5 through the medium of a journal 6 thereof, rotated for example between two successive crank arms or webs 7, of which a portion of the crank pins or wrists and the balance masses or weights are seen on FIG. 2. Each main bearing 2 consists of a bearing block, saddle or body 8 disposed between two flanges, brackets or cheeks of the frame structure 1 and secured thereto by screws, bolts or the like 9. This bearing block or saddle forms the housing, seat or journal rest for receiving a lower half bushing, bearing shell or brass 10a, which is completed by an upper half bushing, bearing shell or brass 10b, retained in position by a bearing cap 11, pressing the top half bushing or bearing shell against the bottom half bushing or bearing shell with an accurately determined securing or clamping force.

This securing or clamping force is produced by at least one device 12 according to the invention, mounted between the top or upper portion of the bearing cap 11 and a transverse portion 13 integral with the crank-case or frame 1. This portion 13 has desirably the shape of a clevis or the like, extending upwards from both aforesaid side brackets, flanges or cheeks and integral therewith. The bearing base block or saddle 8 is also connected or fastened to the bearing clevis, bridge piece or arch 13 by two tie-rods, bolts or the like 14, screwed into the clevis or bridge portion by their upper threaded end and engaging or bearing against the bearing body or saddle by their opposite or lower end by means of a castillated nut locked by a split pin, the correct relative positions of the bearing saddle and of the clevis being given by at least two centering collars, bushes, rings or sleeves 15, associated with the tie-rods, respectively, and retained in place or locked each one by a pin or tit 16 which is locked in turn by the presence of the bearing cap.

The use of a single clamping device 12 offers the advantage of the least bulk or size, so that this reduction in the required space results in a minimum spacing between the legs of the clevis 13, hence of the tie-rods 14, so that the bending deformations or strains are decreased.

The device 12 comprises a hydraulic jack or ram actuator 17, directly incorporated into the bearing cap 11 and adapted to exert an axial thrust upon the lower end of a pressure element or thrust member 18 the upper end of which, i.e. the end remote from the hydraulic jack, bears against or engages the corresponding adjacent stationary supporting structure formed by the bearing arch, clevis or bridge piece 13, through the medium of a pad or spacer member or the like 19, interposed between the pressure element 18 and the clevis 13. The pressure element 18 consists of a pressure screw 20 formed with a desirably hexagonal intermediate portion or head 21 to facilitate its rotation by means of a wrench or spanner, and of a nut 22, screwed on the threaded portion of the screw 20. This nut comprises for example of a lower cylindrical portion 23, formed with substantially radial notches, recesses or blind holes 24, for enabling its rotation by means of a fork-wrench, a claw foot or a hook-spanner, as well as an upper hexagonal portion 25 for adaptation thereto of an ordinary nut wrench.

The hydraulic jack 17 comprises a cylindrical working chamber 26 having a substantially vertical axis, formed or recessed in the upper portion or top of the bearing cap 11 and opening or leading at the top to the outside by its upper end located towards the pressure element 18. In this chamber is slidably mounted a piston 27, provided about its periphery with sealing rings or annular sealing packings and adapted to undergo a hydraulic pressure applied on its lower or inner face. For this purpose, the lower portion or bottom of the chamber 26 communicates by at least one connecting duct 28 (formed in the bearing cap 11 and opening towards the inner or bottom face of the piston), with an outer connecting means arranged on a side face of the bearing cap so as to be accessible and preferably closable by a removable plug or the like 29, possibly locked by a safety wire.

The jacking piston 27 desirably comprises, towards its lower or bottom face, a coaxial guiding extension or projection 30, integral with said piston and slidably mounted in sealing relationship (owing to the presence of sealing rings or packings accommodated in suitable grooves or slots of said extension or projection), in a corresponding bore 31 of the bearing cap 11, opening into the bottom of the chamber 26. To prevent the piston 27 from moving undesirably out from the chamber 26, the latter is advantageously provided, at its upper open end, with a stop or catch 32, such as a self-locking collar or a split, yieldable or resilient retaining ring or a spring clip, engaging a groove formed in the inner wall of the chamber. The length of the pressure screw 20 and/or of the pad or spacer member 19 is sufficient for the lower end of the screw 20 to extend into the chamber 26, so that the jacking piston 27 may engage the pressure screw 20 before engaging the stop or retaining member 32.

The pad or spacer member 19 comprises, in a manner known per se, a centering boss or tit 33, engaging a suitable recess or socket formed in the clevis 13 and adapted to hold the pad or spacing member against substantially horizontal sidewise displacement. Moreover, to prevent the pad or spacer member 19 from being rotated by frictional contact when the pressure screw 20 is operated, this pad or spacer member comprises, towards its tit or boss 33, an end portion of square contour or equivalent shape 34 (see FIG. 1) engaging a corresponding groove 35 of the adjacent fixed supporting structure formed by the clevis, bridge piece or bearing arch 13.

In a manner known per se, the terminal or front face of each end of the pressure element 18 is of substantially spherical shape, whereas the bearing surface of the adjacent stationary supporting structure co-operating through pressure contact with each front or terminal face, forms a seat for the latter, having a complementary shape of revolution, somewhat like a knuckle, swivel or ball-and-socket joint. Thus, the front or terminal face of each end of the pressure screw 20 is bulged or of convex spherical shape, whereas the adjacent contacting surfaces of the spacer element 19 and of the jacking piston 27, respectively, are of concave either conical or spherical configuration. The front or terminal bearing face at the lower end of the nut 22 is for example also concave and either spherical or conical, whereas the corresponding complementary contacting surface of the adjacent stationary supporting structure, formed by the bearing cap 11, is bulged or of convex spherical shape. Instead of the nut 22 directly engaging or resting on the bearing cap 11, it is advantageous to interpose, between the nut and the bearing cap, a shaped washer or the like 36 with a bulged or convex spherical top face for engaging the nut. Such an intermediate washer may promote the formation of a tight joint or seal relative to the lubricating oil flowing through the device 12.

The lubrication of the bearing shell, bushing or brass is effected by means of a channel or duct 37 extending in substantially coaxial vertical relationship through the device 12 and consisting of a series of longitudinal bores or axial passageways successively extending through the spacer member 19, the pressure screw 20, the jacking piston 27 and its guide shank 30 and the bottom of the bearing cap 11. At its upper end, the lubrication channel or duct 37, which opens through the tit or boss 33, connects to or is substantially aligned with the adjacent orifice of a lubricating oil supply or feed line or conduit 38, formed in the upper portion of the bearing clevis, arch or bridge piece 13, which conduit opens preferably on one side or lateral face of said clevis into an adapter element for connection to a source or circuit of lubricant. At its lower end, the duct 37 opens into the housing for the upper half bearing shell or bushing 10b, preferably substantially in front of passageways 40, extending through the bushing or bearing shell and opening into oil grooves or the like formed in the radial inner face of the bushing or shell. The lubricating oil of the journal 6 of the shaft is recovered or collected by substantially radial channels 41 extending through the journal 6 and opening into a central channel 42, extending in substantially coaxial relationship through the journal to feed oil, through each crank arm or web, to the adjacent crank pins and the corresponding bushings of the connecting rod big end or pitman-head.

In the form of embodiment shown, the nut of the pressure element 18 bears against the bearing cap 11, whereas the associated pressure screw 20 bears against the bearing clevis 13 through the medium of the pad or spacer member 19. This arrangement could of course be reversed so that the nut 22 bears against the bearing clevis 13, possibly through the medium of an intermediate washer 36, and the associated pressure screw bears against the bearing cap 11, possibly through the medium of the pad or spacer member 19. Moreover, instead of feeding the lubricating duct 35 by a conduit 38 drilled or bored in the bearing clevis 13, it is possible to feed it in any other suitable manner, in particular through the medium of channels formed in the engine casing, as is well known in the art.

Stopping, locking or retaining means are desirably provided to hold the nut 22 and the associated screw 20 positively against motion with respect to each other and consist for example of a locking washer or bolt 43, the central opening of which comprises a serrated, jagged, ribbed, grooved, fluted, splined or polygonal contour with a number of sides exceeding that of a hexagonal portion or section 21 of the pressure screw and adapted to fit on said hexagonal portion or section. The aperture 44 of the locking or retaining washer 43 will for example be in the shape of a regular dodecagon. Thus, the washer will always be adapted to engage some edges or sides of the hexagonal portion 21 of the pressure screw 20. This washer 42 is fastened to the top end face of the nut 22 by screws 45 (see FIG. 1) which are locked in turn for example by locking angle plates with folded-down flanges or by any other suitable equivalent means, exerting for example an automatic safety locking action either through a pre-stressing force, or by a shaping action (through folding back or clenching) or by addition of filling material (welding or brazing) or even possibly by a lock nut.

The operation of this device is the following. Assuming that the assembly 12 has been positioned beforehand, the conduit 28 feeding the chamber 26 of the hydraulic jack is connected to a source of pressure oil or hydraulic fluid, for example to a pump or to a hydraulic compressor, provided with a pressure gauge indicating the securing or clamping pressure actually applied at each time. The locking washer 43 has been previously detached from the nut 22 and raised above the hexagonal portion 21 of the pressure screw 20 to be kept in position for example at the level of the smooth portion of the top end of said screw. When the chamber 26 is supplied with pressure fluid, the piston of the hydraulic jack 27 applies an upward thrust to the bottom end of the pressure screw 20, thereby effecting a gradual clamping of the bearing cap 11 owing to the support reaction from the bearing clevis 13. When the pressure indicated by the pressure gauge has reached a predetermined value required for clamping the bearing cap, the piston 27 is hydraulically locked to maintain this desired clamping pressure, and the nut 22 is screwed, for example by means of a suitable claw foot or hook wrench, so as to take up all the clearance available between the nut and the bearing cap 11 or the intermediate washer 36 so as to make it bear thereagainst, whereby the assembly 18, consisting of the screw 20 and the nut 22, now carries out mechanically the desired clamping, thereby superseding the hydraulic jack 17 when the hydraulic pressure is released. The locking washer 43 is then lowered and fitted on the hexagonal portion 21 of the pressure screw while seeking a fitting position such that the holes in the washer 43 for the fastening screws 45 be aligned or register with the corresponding tapped holes provided in the nut 22. To this end, it may be necessary to slightly rotate the nut 22 or the screw 20 or either of them at the same time or still to slightly vary the hydraulic pressure for achieving said alignment or registering relationship. The washer 42 is then fastened to the nut 22 by the screws 45 which are locked in the manner shown, then the chamber 26 is connected to the exhaust for releasing the pressure therein and the port terminating the conduit 28 in the bearing cap 11 is closed by the plug 29. The duct 38 in the bearing clevis is then connected to the conventional lubricating circuit or oil supply line. The complementary spherical or conical contacting surfaces between the various components forming the device 12 co-operate to achieve fluid tightness of the lubricant passageways for the lubricating oil flowing through the channel 37 extending through the device.

It should be noted that in case of failure of the hydraulic system or when a hydraulic pressure source is not available, a direct mechanical clamping or securing of the bearing cap may be also achieved by operating or tightening the nut 22 by means of a wrench or spanner adaptable to the hexagonal configuration of the nut.

While the mounting of the crank-shaft bearing described hereinabove and shown relates to a type of bearing which is removable downwards from the crankcase or main frame, it is obvious that the device according to the invention is applicable to any type of bearings and in particular to bearings, such as plummer-blocks, which may be removed, dismantled or disassembled upwards or from above.

It is understood that the invention should not be construed as limited to the form of embodiment herein described and shown and has been given by way of an illustrative example only, as many modifications and alterations may be effected or designed by those skilled in or conversant with the art without departing from the principle, teachings and scope of the invention as defined in the appended claims.

What is claimed is:

1. In an engine comprising a crank case, a crank shaft mounted in said crank case, at least one main bearing therefor consisting of a bearing saddle mounted in said crank case, a bearing cap adapted to be pressed against said bearing saddle in encompassing relation to said crank shaft and a bridge piece straddling said bearing cap and integral with said crank case, a clamping device for accurately fastening and pressing said bearing cap against said bearing saddle comprising: hydraulic jack means incorporated in said bearing cap; pressure screw and nut means associated in coaxial relation with said hydraulic jack means, said pressure screw means engaging said hydraulic jack means and said nut means bearing upon said bearing cap; at least one spacer member interposed between said pressure screw means and said bridge piece; locking means for positively holding said pressure screw means and said nut means against motion with respect to each other.

2. Clamping device as defined in claim 1, wherein said hydraulic jack means include a working chamber formed in said bearing cap and opening to the outside thereof, a piston slidably mounted in said working chamber, the hydraulic pressure receiving face of said piston being integral with a guide shank portion extending through a bore in the bottom of said working chamber, whereas said pressure screw means directly engage endwise the adjacent outer front face of said piston.

3. Clamping device as defined in claim 1, wherein said pressure screw means include end bearing faces, each of them being of substantially spherical convex shape, whereas the adjacent contacting surfaces of said spacer member and said piston, respectively, are of substantially spherical shape.

4. Clamping device as defined in claim 1, wherein said pressure screw means include end-bearing faces, each of them being of substantially spherical convex shape, whereas the adjacent contacting surfaces of said spacer member and said piston, respectively, are of substantially conical shape.

5. Clamping device as defined in claim 1, wherein said pressure screw means include a polygonal portion, whereas said locking means comprise at least one locking-washer adapted to be fitted on said polygonal portion and fastened by locked screws to said nut means.

6. Clamping device as defined in claim 1, wherein said nut means are provided with a lower bearing surface of substantially spherical concave shape, whereas the corresponding contacting surface of said bearing cap has a spherical convex shape.

7. Clamping device as defined in claim 1, wherein said nut means are provided with a lower bearing surface of substantially conical concave shape, whereas the contacting surface of said bearing-cap has a spherical convex shape.

8. Clamping device as defined in claim 2, wherein said working-chamber communicates through one passageway duct with an outer connecting portion for pressure fluid conveying means, which portion is adapted to be closed by removable plug means.

9. Clamping device as defined in claim 1, wherein a lubricant feed-duct is provided in a substantially coaxial relationship through said spacer member, pressure screw means, hydraulic jack means and bearing cap, to open at one end through the radial inner wall surface of said bearing cap, and to connect with its other end to a lubricant supply line provided in said bridge piece.

10. Clamping device as defined in claim 1, wherein said spacer member comprises one substantially peripheral square projecting portion engaging a socket-like recess formed in said bridge piece.

References Cited

UNITED STATES PATENTS

| 2,608,754 | 9/1952 | Isenberg | 29—238 |
|---|---|---|---|
| 2,807,081 | 9/1957 | Black | 29—252 |
| 3,346,944 | 10/1967 | West | 29—252 |
| 3,359,618 | 12/1967 | Murphy | 29—200 |
| 3,403,434 | 10/1968 | Calabro | 29—149.5 X |

THOMAS H. EAGER, Primary Examiner

U.S. Cl. X.R.

29—149.5, 238, 252